United States Patent
Alam et al.

(10) Patent No.: US 7,464,038 B2
(45) Date of Patent: *Dec. 9, 2008

(54) METHOD AND SYSTEM FOR CHANGING AN ORDER IN A FLEXIBLE ORDER TRANSACTION SYSTEM

(75) Inventors: Muhammad M. Alam, Santa Clara, CA (US); Ruediger Meyfarth, Heidelberg (DE); Sam S. Hwang, Los Altos, CA (US); Rama Koti R. Konatham, Sunnyvale, CA (US)

(73) Assignee: SAP AG, Walldorf (DE)

( * ) Notice: Subject to any disclaimer, the term of this patent is extended or adjusted under 35 U.S.C. 154(b) by 1113 days.

This patent is subject to a terminal disclaimer.

(21) Appl. No.: 10/851,281

(22) Filed: May 21, 2004

(65) Prior Publication Data

US 2005/0261947 A1 Nov. 24, 2005

(51) Int. Cl.
G06Q 10/00 (2006.01)
G06Q 30/00 (2006.01)
G06F 17/50 (2006.01)
G06F 17/00 (2006.01)

(52) U.S. Cl. ............................ 705/1; 705/26; 705/28; 705/29; 705/400; 705/500; 705/6; 705/7; 705/8; 705/9; 705/10; 700/99; 700/100; 700/105

(58) Field of Classification Search .................. 705/1, 705/6, 7, 8, 9, 10, 26, 28, 29, 400, 500; 700/99, 700/100, 105

See application file for complete search history.

(56) References Cited

U.S. PATENT DOCUMENTS

| | | | | |
|---|---|---|---|---|
| 5,818,716 | A | * 10/1998 | Chin et al. | 700/100 |
| 6,023,683 | A | 2/2000 | Johnson et al. | |
| 2001/0027447 | A1* | 10/2001 | Matsuura | 705/400 |
| 2002/0069103 | A1* | 6/2002 | Puri et al. | 705/11 |
| 2002/0077979 | A1 | 6/2002 | Nagata | |
| 2002/0099585 | A1* | 7/2002 | Locke | 705/7 |
| 2003/0172007 | A1* | 9/2003 | Helmolt et al. | 705/28 |
| 2004/0143488 | A1* | 7/2004 | Wang | 705/10 |
| 2005/0131779 | A1 | 6/2005 | Kitamura et al. | |

FOREIGN PATENT DOCUMENTS

JP 2001154722 A 6/2001

* cited by examiner

Primary Examiner—Yogesh C Garg
(74) Attorney, Agent, or Firm—Kenyon & Kenyon LLP

(57) ABSTRACT

A method and system for changing an order for a product where production of the order is currently in progress in a flexible order transaction system and where yield, scrap, and work-in-process (WIP) are calculated for reporting points in the order process and are transferred to the new order for the new product. The transfer from the original order to the new order occurs at several mapped reporting points in the product change action. Unmapped scrap, WIP, and/or component and resource usage may be transferred to the new order at preceding or subsequent mapped reporting points from the original order to the new order.

22 Claims, 3 Drawing Sheets

ORDER_A
(original-Product "A")
Quantity 10
300a

ORDER_B
(new--Product "B")
Quantity 10
300b

METHOD AND SYSTEM FOR CHANGING AN ORDER IN A FLEXIBLE ORDER TRANSACTION SYSTEM

FIELD OF THE INVENTION

The present invention relates to a method and system for changing the product in an order in a flexible order transaction system. In one embodiment of the present invention, the flexible order system relates to a shop floor manufacturing system controlling already in progress production orders.

BACKGROUND OF THE INVENTION

In conventional flexible order transaction systems in manufacturing, changing the product in orders that are already in progress is possible but is limited in the way production is mapped between the original order and new order. For example, if a production process for the original order involves 5 steps O1-O5 and the production process for the new order involves 10 steps N1-N10, the original order may be changed (transferred) to the new order at a specified pair of mapped steps (e.g., O2 to N5). This mapping may occur between reporting points for the steps. A reporting point is the conclusion of a discrete step in a production process where an accurate accounting of the progress of an order may be made. Typically, the original order for the original product will have a different production process with different reporting points than the new order for the new product. Reporting points may be used to define the steps in the production process and it is typically at one pair of reporting points that a change in the order is made. It is at this point, where successfully processed yield, unsuccessfully processed scrap, an work-in-process (WIP) quantities are mapped and transferred to the order for the new product. Conventional flexible order transaction systems do not provide the ability to change the order at multiple reporting points across the production process for the original order. Additionally, they do not allow for the flexible transfer of WIP and scrap at unmapped reporting points in the production process. Conventional flexible order transaction systems incorporate product change functionality for production orders but do not provide for the detailed changing of the order at multiple reporting points across the production process. For example, the lot product update functionality in the Oracle® Shop Floor Management 11i system is one example of a conventional flexible order transaction system.

Providing greater flexibility in changing already in progress production orders is important for a number of reasons. This flexibility can help manufacturers when the demand for the original product in the original order decreases and the demand for a similar product increases. For example, in semiconductors, similar chips of different speeds are processed in similar processes and lend themselves more easily to product change to reflect existing demand. Manufacturers may also benefit from changing an already in progress order when the test results or grade of the product at one of the operations (reporting points) in the process indicate its suitability for use in another product. For example, in semiconductors where similar processes exists for chips of different speeds, the test results at one step in the production process may make the change in product for the order beneficial. Greater flexibility in the flexible order transaction system may allow a product change to transfer across multiple reporting points all the remaining WIP from an original order to a new order for a different product—an option not available in conventional systems.

SUMMARY

In one embodiment of the present invention, a method for changing a product in an order in a flexible order transaction system where production of the order is currently in progress allows the production to be transferred at multiple points in the manufacturing process overcoming some of the limitations of conventional systems. According to one embodiment, a request for a product change in the order only needs to specify the new product for the order to be changed. A new order for the new product may automatically be generated and the production from the original transferred to the new order. At each reporting point in the process for the original order, the quantity of successfully processed product (i.e., the yield), the quantity of unsuccessfully processed product that cannot be reprocessed (i.e., the scrap), and the as of yet unprocessed product (i.e., the work-in-process or WIP) are determined. In another embodiment, the WIP may include not only the as of yet unprocessed product but also unsuccessfully processed product that can be reprocessed (i.e., reworked) and/or the product that is currently being processed. The reporting points in the original order are mapped to reporting points in the new order and the yield, scrap, and WIP at each mapped reporting point in the original order are transferred to the corresponding mapped reporting point in the new order. The scrap and WIP at each unmapped reporting point in the original order can also be transferred to the new order. The unmapped scrap and WIP may be transferred using the mapping at the first preceding (i.e., first earlier) mapped reporting point in the original order in one embodiment of the present invention. In another embodiment, the unmapped scrap and WIP may be transferred using the mapping at the first subsequent mapped reporting point in the original order. The present invention allows the changing of an order (a product change)—the transfer of yield, scrap, and WIP from an original order for a first product to a new order for the second product—to occur at multiple reporting points in a single product change transaction. For example, using the SAP® Flexible Order Transaction in the Advanced Planning and Optimization (APO), a product change transaction may include the transferring of production quantities (yield, scrap, and WIP) across multiple reporting points from the original order for the first, original product to the new order for the second, new product. The mapping between the process associated with the original order and the process associated with the new order may already exist in a mapping table of the flexible order transaction system or may be specified during the product change request in separate embodiments of the present invention. Even where a user specifies mapping, the user does not have to specify all the mapping between reporting points in the original and new orders as may be required in conventional systems. Additionally, detail mapping does not need to be provided when a product change occurs. For example, where to transfer unmapped scrap and WIP from the original order for the original product to the new order for the new product can be automatically determined by the system by using a "soft up" approach where the unmapped scrap and WIP may be transferred at the first preceding mapped reporting point in one embodiment of the present invention. In another embodiment, under these same circumstances, unmapped scrap and WIP may be transferred at the next subsequent mapped reporting point using a "soft down" approach.

DETAILED DESCRIPTION

In a flexible order transaction system, a change in the product for an order may be made generating a new order and transferring the production between several reporting points in the production process for the original order to corresponding reporting points in the production process of the new order according to one embodiment of the present invention. In an embodiment, the original order is deleted and the new order is generated with all the production being transferred from the original order to the new order. In an alternative embodiment, part of the production for the original order is transferred to the new order and both the new order and the original order remain after the product change occurs. The new order may have different or similar structure and processing (i.e., process structure) as compared to the original order. The processing or process structure is the actual work (i.e., processing) performed on the production inputs (i.e., the components) using the process resources (i.e., resources) to transform a product from components at the start of the process to a final product according to one embodiment of the present invention. The actual work (i.e., the processing or process structure) that is performed may differ between the original order and the new order or may share the same process structure. If the process structure of the new order is different from the original order, mapping between the processes as discussed in applications incorporated by reference may be necessary.

Figure 1:
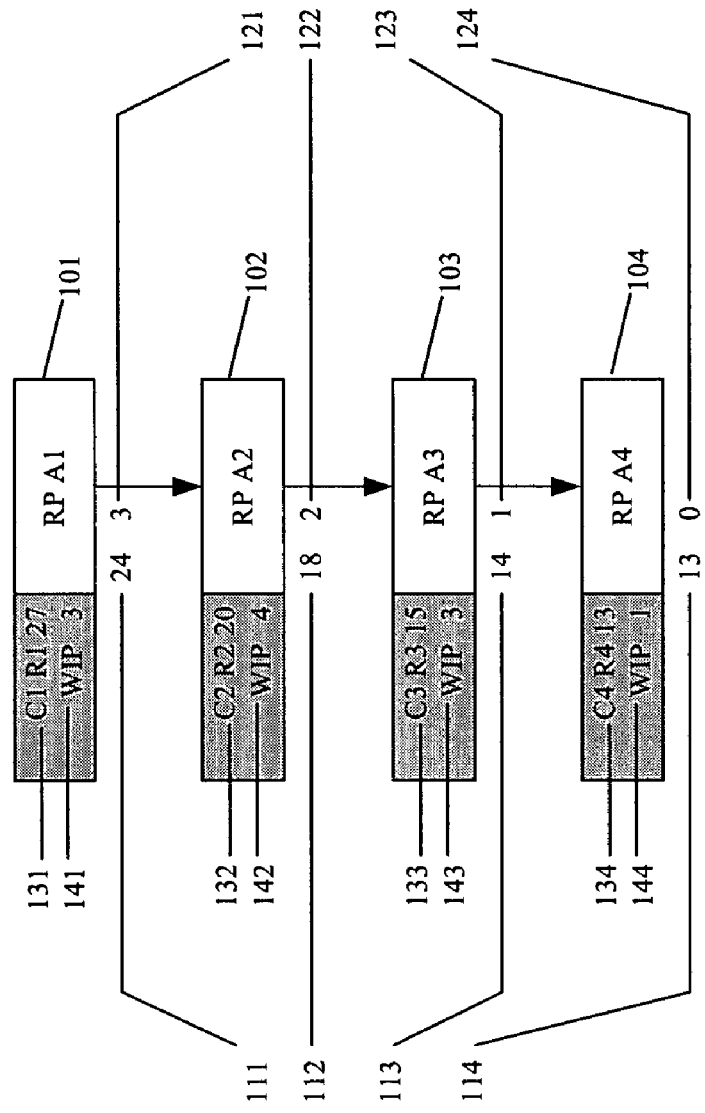
FIG. 1 is a diagram illustrating the processing of an example production order before the product change according to one embodiment of the present invention.

FIG. 1 is a diagram illustrating the processing of an example production order before any transfer of production occurs according to one embodiment of the present invention. The example embodiment shown in FIG. 1 depicts an order, Order_A, 100 for the production of 30 units of a product. A production process, according to one embodiment of the present invention, is the process needed to convert inputs (e.g., components and resources) into a product or to modify a manufactured item in order to produce a desired finished product. The inputs into the production process can be considered components, the physical items required to produce the product, and resources, the labor, machinery, and other services required to produce the product. In the example embodiment shown in FIG. 1, a production process may be divided in several discrete steps representing particularly distinct or distinguishable portions of the process at the conclusion of which an accurate accounting of the progress of an order may be made. A reporting point (RP) is the conclusion of one of these portions or steps in the production process and at which the status of the order may be confirmed. The order status may be determined by any conventional means including manual and automated reporting on order status. In the embodiment shown in FIG. 1, the production process associated with Order_A 100 includes four reporting points (RP): RP A1 101, RP A2 102, RP A3 103, and RP A4 104.

At each reporting point (RP), the inputs for the product are consumed as part of the shop floor production process according to one embodiment of the present invention. At each reporting point, a unit of the product is either successfully processed—ending up as "yield"—or is unsuccessfully processed—ending up as "scrap". Yield is the quantity of the product that has already been processed at an activity level reported on at the reporting point. Scrap is the quantity that at a given activity level (reporting point) will no longer be further processed. The remaining quantity still undergoing processing or still waiting for processing to initiate for the reporting point (RP) is considered the Work-in-Process (WIP) quantity. According to one embodiment of the present invention, if an unsuccessfully processed unit of the product can be reprocessed, it is considered WIP instead of scrap, which can't be reprocessed. In other words, according to this embodiment, an unsuccessfully processed unit of product at a reporting point is considered scrap if it can't be reprocessed while, if it can be reprocessed, it is considered WIP and eventually reprocessed—scrap is not salvageable.

At each reporting point, the quantity of yield, scrap, and WIP equal the yield from the preceding reporting point according to one embodiment of the present invention. At the first reporting point, the quantities of yield, scrap, and WIP equal the order quantity according to this embodiment. For example in FIG. 1, Order_A 100 is placed for a quantity of 30 units of the product. At reporting point A1 101, the first reporting point, the quantity of yield, scrap, and WIP equal the 30 units for the order. The quantity of yield at RP A1 101 is 24 units 111 while the quantity of scrap is 3 units 121 and the quantity of WIP is 3 units 141 totaling the 30 units for the order 100. At reporting point A2 102, the second reporting point, the quantity of yield, scrap, and WIP need to equal the 24 units of yield 111 at the preceding RP A1 according to this embodiment of the present invention. The quantity of yield at RP A2 102 is 18 units 112 while the quantity of scrap is 2 units 122 and the quantity of WIP is 4 units 142 totaling the 24 units of yield 111 at RP A1 101. The yield quantity at the final reporting point in a production process represents the total quantity of the finished product produced so far and may be the reporting point at which the ordered goods are received. For example, the final reporting point shown in FIG. 1 is reporting point A4 104. At RP A4 104, the quantity of yield is 13 units 114 representing the total quantity of the finished product produced up to this point.

In the example shown in the embodiment in FIG. 1, an order 100, Order_A, is placed for a quantity of 30 of a product. The process for Order_A includes four reporting points in the example shown in FIG. 1. At reporting point A1 101, 24 units 111 of the product have been successfully processed and are considered yield at this reporting point. Three units 121 have been unsuccessfully processed and can't be reworked (i.e., reprocessed) and have become scrap at this reporting point. A remaining 3 units 141 of the product have yet to begin or complete the production process up to reporting point A1 and are considered WIP. Components and resources are used in the processing occurring up to RP A1 101. In the example embodiment in FIG. 1, 1 unit of component and 1 unit of resource are used per unit processed. At reporting point A1 101, the quantity of components (C1) and resources (R1) used each equal 27 units 131 for the units of yield 111 and scrap 121 that have been processed.

Of the 24 units of yield 111 at RP A1 101, 18 units 112 of the product have been successfully processed and are considered yield at reporting point A2 102. Two units 122 have been unsuccessfully processed and can't be reworked (i.e., reprocessed) and are scrap at RP A2 102. Four units 142 of the product (out of the 24 111) remain to be processed or to complete processing and are WIP at RP A2 102. The quantity of components (C2) and resources (R2) used for the processing to reporting point A2 102 each equal 20 units 132 for the units of yield 112 and scrap 122 that have been processed.

At reporting point (RP) A3 103, only 14 units 113 of the 18 units 112 of the product yielded at RP A2 102 have been successfully processed and have become yield. One unit 123 has been unsuccessfully processed and can't be reworked (i.e., reprocessed) and, therefore, is now scrap at RP A3 103. Three units 143 remain to be processed or to complete processing at RP A3 103 and are considered WIP. The quantity of components (C3) and resources (R3) used for the processing to reporting point A3 103 each equal 15 units 133 for the units of yield 113 and scrap 123 that have been processed.

Of the 14 units 113 of the product yielded (i.e., successfully processed) at RP A3 103, 13 units 114 have been successfully processed (are yield) at RP A4 104. Because RP A4 104 is the final reporting point, the 13 units 114 of yield at RP A4 104 are finished products of the process A1-A4 for Order_A 100 according to this embodiment of the present invention. There is no scrap 124 at RP A4 104 and the remaining one unit 144 is WIP at this reporting point. The quantity of components (C4) and resources (R4) used for the processing to reporting point A4 104 each equal 13 units 134 for the units of yield 114 and scrap 124 that have been processed.

According to the example depicted in FIG. 1, a quantity of 30 units 100 is ordered with 13 units 114 of final product produced at RP A4 104. The successfully processed yield throughout the process includes 24 units 111 at RP A1 101, 18 units 112 at RP A2 102, 14 units 113 at RP A3 103, and 13 units 114 at RP A4 104. Of the quantity of 30 units 100, 6 units have been unsuccessfully processed and are not capable of being reworked (i.e., reprocessed) and are considered scrap: 3 units 121 at RP A1 101, 2 units 122 at RP A2 102, 1 unit 123 at RP A3 103, and none 124 at RP A4 104. Of the quantity of 30 ordered, 11 units remain as WIP at the various reporting points: 3 units at RP A1, 4 units at RP A2, 3 units at RP A3, and 1 unit at RP A4. The example represented in FIG. 1 indicates that only the WIP remains to be processed. Yield and scrap require no further processing at the different reporting points. Therefore, only 11 units of the product (i.e., the WIP) remain to be processed: 3 units 141 at RP A1 101, 4 units 142 at RP A2 102, 3 units 143 at RP A3 103, and 1 unit 144 at RP A4 104. The final yield (i.e., the finished product) of 13, the total scrap of 6, and the total work-in-process (WIP) of 11 equal the total order quantity of 30 according to this embodiment.

Figure 2:
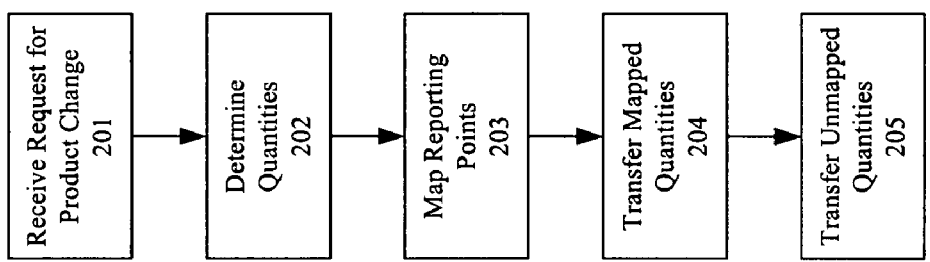
FIG. 2 is a diagram depicting the product change process according to one embodiment of the present invention.

FIG. 2 is a diagram depicting the product change process according to one embodiment of the present invention. The first step in the process for changing the product is to "Receive Request for Product Change" 201. The request may be received in any number of ways according to various embodiments of the present invention. In the example embodiment, the request is received from the customer placing the order through a flexible order transaction system, a software application allowing flexible orders to be placed including the changing of a product in a production order already in progress. The request to change the product does not need to specify the quantity of the product to be changed and may only require the specification of the new product for the order. The quantity of product to change can be determined from the original order or through some alternate specification, such as, for example, to change the product for all the WIP remaining in an order. In an alternative embodiment of the present invention, the product change process described herein can be used to transfer a partial quantity from an original order to a new order for a different product with the original order continuing to exist after the partial quantity is transferred. According to this embodiment, the user (e.g., the customer) may specify the partial quantity to be transferred as well as the new product for the product change order.

In the "Determine Quantities" step 202, the quantities for each reporting point of the original order are determined. According to this step, the yield, scrap, and work-in-process (WIP) are calculated at each reporting point in the process for the original order. For example, using the information provided in FIG. 1 where Order_A is the original order, reporting points A1-A4 101-104 exist for the process used to implement Order_A. At reporting point A1 101, the following quantities of the product are determined: 24 units of yield 111, 3 units of scrap 121, and 3 units of WIP 141 all equaling the 30 units 100 requested in the original order. At reporting point A2 102, the following quantities of the product are determined: 18 units of yield 112, 2 units of scrap 122, and 4 units of WIP 123 all equaling the 24 units of yield 111 ready for further processing after RP A1 101. At reporting point A3 103, the following quantities of the product are determined: 14 units of yield 113, 1 unit of scrap 123, and 3 units of WIP 143 all equaling the 18 units of yield 112 ready for further processing after RP A2 102. At reporting point A4 104, the following quantities of the product are determined: 13 units of yield 114, no units of scrap 124, and 1 unit of WIP 144 all equaling the 14 units of yield 113 ready for further processing after RP A3 103.

In the "Map Reporting Points" step 203, mapping data between the reporting points of the process for the original order (e.g., Order_A) and the new order (e.g., Order_B) is determined. The mapping data may be determined in different ways according to various embodiments of the present invention. In one embodiment, the mapping data may be determined by retrieving mapping data already stored for the processes. For example, data from a mapping table containing the reporting point mapping between the processes associated with the original order, e.g., Order_A, and the new order, e.g., Order_B, may be retrieved. In another embodiment, a user may specify the mapping data when the product change is requested. For example, when the user enters the product change request using flexible order transaction software running on a computing device such as a computer, the user may specify that reporting points A1, A3, and A6 in the original order correspond to reporting points B1, B2, and B5 respectively in the new order. In another embodiment of the present invention, the mapping data may be calculated using other variables to determine at which reporting points similar processing has occurred.

The mapping data does not need to include mapping from all the reporting points in the process associated with the original order to corresponding reporting points in the process associated with the new order, according to this embodiment—though all reporting points may be mapped. For example, the mapping between an original order, e.g., Order_A, with associated reporting points A1-A7 may only map 3 of the reporting points (e.g., A1, A3, and A7) with a new order, e.g., Order_B, for a different product. Just as all the reporting points in the process associated with the original order do not need to be mapped, all the reporting points in the process associated with the new order also do not need to be mapped to the original order. For example, a new order, e.g., Order_B, with associated reporting points B1-B5 may only have 3 reporting points mapped to the original order, e.g., Order_A. In one embodiment of the present invention, two or more reporting points associated with an original order (e.g., Order_C) may be mapped to a single reporting point associated with a new order (e.g., Order_D). This may occur where the additional processing for the second reporting point in the original order (e.g., Order_C) does not add anything above the processing for the first reporting point in the original order in relation to the processing that needs to occur in the new order (e.g., Order_D). For example, under these circumstances, reporting points C2 and C3 associated with an original order, Order_C, may be mapped to a single reporting point D3 associated with a new order, Order_D. In one embodiment of the present invention, a single reporting point associated with an original order (e.g., Order_E) may be mapped to two or more reporting points associated with an original order (e.g., Order_F). For example, reporting point E3 associated with an original order, Order_E, may be mapped to reporting points F3 and F4 associated with a new order, Order_F. The above examples help illustrate the implementation of mapping in various embodiments of the present invention. Any conventional mapping means may be used to determine and supply the mapping data required.

In the "Transfer Mapped Quantities" step 204, yield (i.e., the successfully processed units), scrap (i.e., the unsuccessfully processed units that can't be reworked), and the WIP (i.e., units awaiting or undergoing processing) are transferred from the original order (e.g., Order_A) to the new order (e.g., Order_B) at each mapped reporting point. For example, if reporting points A1, A3, and A7 associated with Order_A (the original order) are mapped respectively to reporting points B1, B2, and B5 associated with Order_B (the new order for a new product), yield, scrap, and WIP are transferred from Order_A to Order_B at each of these mapped reporting points. Yield, scrap, and WIP are therefore transferred between the mapped reporting point pairs: RP A1-RP B1, RP A3-RP B2, and RP A7-RP B5. The component and resource usage for the yield and scrap transferred at the mapped reporting points is also transferred to the new order.

In the "Transfer Unmapped Quantities" step 205, WIP, scrap, and the component and resource usage from non-mapped reporting points in the original order (e.g., Order_A) are also transferred to the new order (e.g., Order_B) at the next mapped reporting point according to one embodiment in the present invention. This embodiment is a "soft down" transfer of unmapped quantities of WIP and scrap. If there are no further mapped reporting points between the original and new orders, the non-mapped quantities are transferred to the last reporting point in the new order according to one embodiment of the present invention. In an alternative embodiment of the present invention, WIP, scrap, and the component and resource usage from non-mapped reporting points in the original order are transferred to the new order at the next preceding mapped reporting point in the production process. This alternative embodiment is a "soft up" transfer of unmapped quantities of WIP and scrap. If there are no preceding mapped reporting points between the original and new orders, the non-mapped quantities are transferred to the first reporting in the new order according to one embodiment of the present invention. In another embodiment of the present invention, unmapped yield, scrap, WIP and component and resource usage at the final reporting point in the original order are transferred to the final reporting point in the new order regardless of whether "soft up" or "soft down" transfer is being used.

The steps described above are illustrative of the process and they can be performed in a different sequence, as necessary. In particular, according to one embodiment of the present invention, the steps of "Transfer Mapped Quantities" 204 and "Transfer Unmapped Quantities" 205 can be performed simultaneously or in sequence for each of the reporting points between an original order and the new order.

Figure 3:
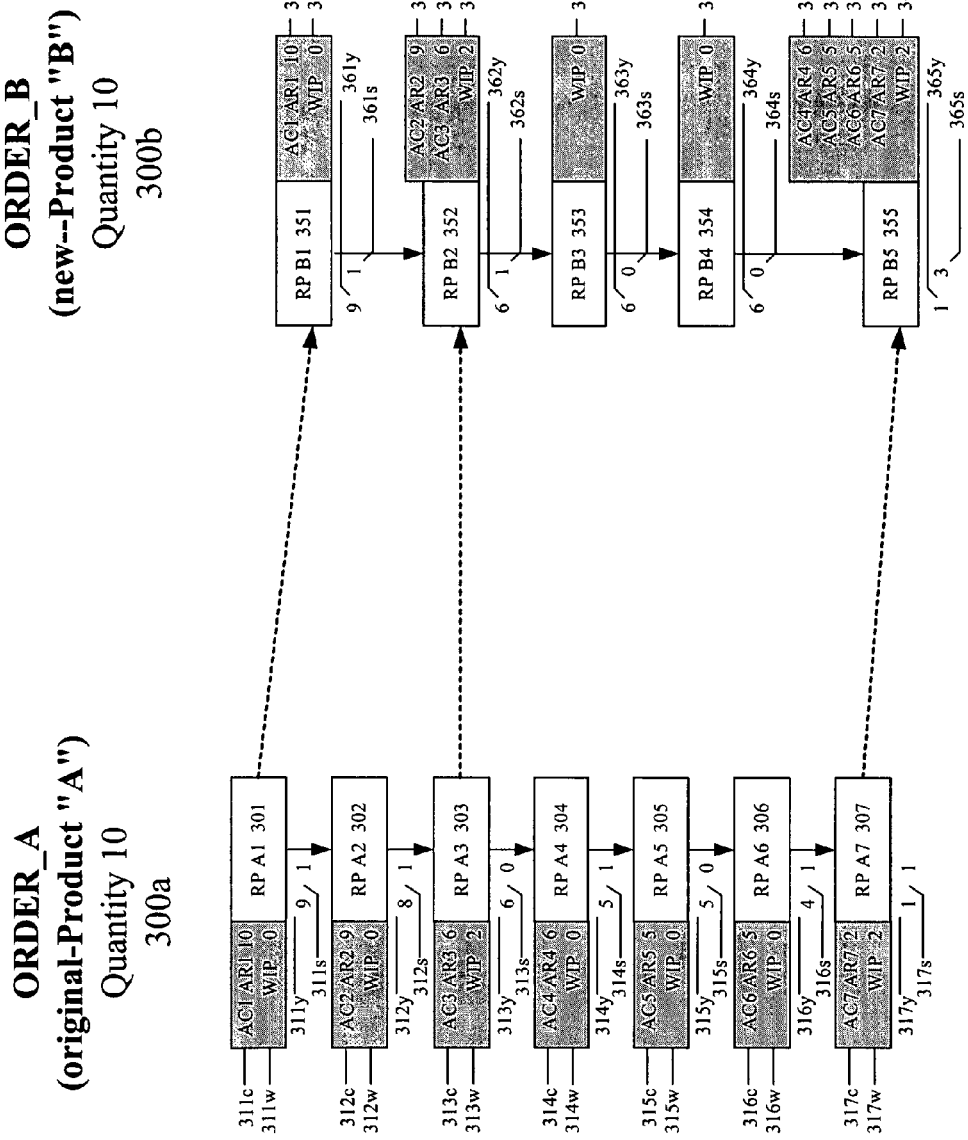
FIG. 3 is a diagram illustrating the product change process according to one embodiment of the present invention.

FIG. 3 is a diagram illustrating the product change process according to one embodiment of the present invention. According to the example embodiment shown in FIG. 3, the production for a product "A" in an original order, Order_A, 300a is transferred to a newly created order, Order_B, 300b for the new product "B". The original order 300a was placed for 10 units of product "A" and the new order is also for 10 units but for product "B".

According to the example shown in FIG. 3, all the production (yield, scrap, and WIP) is transferred from the original Order_A 300a to the new Order_B 300b. In an alternative embodiment, only a portion of the production is transferred to the new order for the product change (the change from product "A" to product "B") while a remainder stays with the original order for the original product—product "A". The implementation of the product change according to the embodiment depicted in FIG. 3 depends on the mapping between the reporting points of the original and new orders and is outlined below.

In the example embodiment shown in FIG. 3, yield, scrap, and WIP are transferred from the original Order_A 300a to the new Order_B 300b according to the mapping between the reporting points associated with the orders. At reporting point A1 301, 9 units of successfully processed yield 311y, 1 unit of unsuccessfully process scrap 311s (which can't be reprocessed), and 0 units of work-in-process (WIP) 311w are available. The yield 311y, scrap 311s, and WIP 311w at RP A1 301 equal the total order quantity 300a of 10 units for Order_A. Reporting point A1 301 maps to reporting point B1 351 in the new order for product "B". Because Order_B 300b is new, there is no existing production (yield, scrap, and WIP) values or component and resource usage prior to the transfer of production from Order_A as part of the product change process. In the embodiment shown in FIG. 3, the product change is for the entire Order_A 300a. Therefore, the yield of 9 units 311y, scrap of 1 unit 311s, WIP of 0 units 311w at RP A1 301 are transferred to RP B1 351. RP B1 351 will then also have a yield of 9 units 361y, a scrap of 1 unit 361s, and a WIP of 0 units 361w. In addition, the component (AC1) and resource (AR1) usage 311c at RP A1 301 is also transferred to RP B1 351. Reporting point A2 302 has a yield of 8 units 312y, a scrap of 1 unit 312s, and a WIP of 0 units 312w totaling the previous yield of 9 units 311y from the previous reporting point RP A1 301. RP A2 302 is not mapped to the new Order_B 300b. Reporting point A3 303 has a yield of 6 units 313y, a scrap of 0 units 313s, and a WIP of 2 units 313w totaling the yield of 8 units 312y at the previous reporting point RP A2 302. RP A3 303 is mapped to RP B2 352 of new Order_B 300b and, therefore, the yield 313y, scrap 313s, and WIP 313w are transferred to RP B2 352. According to the embodiment depicted in FIG. 3, the scrap and WIP of any unmapped preceding reporting points (in this case RP A2 302) are also transferred at the next mapped reporting point. Therefore, an additional scrap of 1 unit 312s and a WIP of 0 units 312w are also transferred from RP A2 302 at the next mapped reporting point RP A3 303 to RP B2 352. Unmapped yield is not transferred according to this embodiment, only unmapped scrap and WIP. The result for RP B2 352 is a yield of 6 units 362y (6 units 313y from RP A3 303), a scrap of 1 unit 362s (0 units 313s from RP A3 303 and 1 unit 312s from RP A2 302), and a WIP of 2 units 362w (2 units 313w from RP A3 303 and 0 units 312w from RP A2 302). The component (AC3) and resource (AR3) usage 313c at the mapped reporting point 303 and the component (AC2) and resource (AR2) usage 312c at any preceding unmapped reporting point 302 are also transferred to RP B2 352. Reporting point A4 304 has a yield of 5 units 314y, a scrap of 1 unit 314s, and a WIP of 0 units 314w totaling the 6 units of yield 313y at the previous RP A3 303. RP A4 304 is not mapped to new Order_B 300b. Reporting point A5 305 has a yield of 5 units 315y, a scrap of 0 units 315s, and a WIP of 0 units 315w totaling the 5 units of yield 314y at the previous RP A4 304. RP A5 305 is not mapped to new Order_B 300b. Reporting point A6 306 has a yield of 4 units 316y, a scrap of 1 unit 316s, and a WIP of 0 units 316w totaling the 5 units of yield 315y at the previous RP A5 305. RP A6 306 is not mapped to new Order_B 300b. Reporting point A7 307 has a yield of 1 unit 317y, a scrap of 1 unit 317s, and a WIP of 2 units 317w totaling the 4 units of yield 316y at the previous RP A6 306. RP A7 307 is mapped to RP B5 355 in new Order_B 300b and, therefore, the RP A7 307 yield 317y, scrap 317s, and WIP 317w are transferred to RP B5 355. As previously stated, preceding unmapped scrap and WIP are also transferred according to this embodiment of the present invention. At preceding unmapped RP A4 304, there is 1 unit of scrap 314s and no WIP 314w (0 units) to transfer to RP B5 355. At preceding unmapped RP A5 305, there is no scrap 315s (0 units) and no WIP 315w (0 units) to transfer to RP B5 355. At preceding unmapped RP A6 306, there is 1 unit of scrap 316s and no WIP 316w (0 units) to transfer to RP B5 355. In addition, the component (AC7) and resource (AR7) usage 317c from the mapped reporting point 307 and the component (AC4, AC5, AC6) and resource (AR4, AR5, AR6) usage 314c, 315c, 316c for the preceding unmapped reporting points are also transferred to RP B5 355.

The end result of the product change process is that all the yield, scrap, WIP, and component and resource usage is transferred from the original order for the first product to the new order for the second product according to one embodiment of the present invention. In the example embodiment depicted in FIG. 3, at RP B1 351, the resulting yield is 9 units 361y (9 units 311y from RP A1 301), the resulting scrap is 1 unit 361s (1 unit 311s from RP A1 301), and the resulting WIP is 0 units 361w (0 units 311w from RP A1 301) totaling 10 units for the placed order quantity for Order_B 300b. Component and resource usage 311c is transferred from RP A1 301. Because Order_B 300b is new, the transferred component and resource usage is the only component and resource usage for Order_B 300b at the time of the product change. At reporting point B2 352, the resulting yield is 6 units 362y (6 units 313y from RP A3 303), the resulting scrap is 1 unit 362s (0 units 313s from RP A3 303 and 1 unit 312s from RP A2 302), and the resulting WIP is 2 units 362w (2 units 313w from RP A3 303 and 0 units 312w from RP A2 302) totaling the 9 units of yield 361y from the preceding RP B1 351. Component and resource usage 313c, 312c is transferred from RP A3 303 and RP A2 302. No reporting points from Order_A 300a map to reporting point B3 353. Therefore, the previous yield of 6 units continues 363y and there is no scrap 363s (0 units) and no WIP 363w (0 units). Because Order_B 300b is new, there is also no component and resource usage at RP B3 353. No reporting points from Order_A 300a map to reporting point B4 354. Therefore, the previous yield of 6 units continues 364y and there is no scrap 364s (0 units) and no WIP 364w (0 units). For reasons previously discussed, there is no component and resource usage at RP B4 354. At reporting point B5 355, the resulting yield is 1 unit 365y (1 unit 317y from RP A7 307), the resulting split is 3 units 365s (1 unit 317s from RP A7 307, 1 unit 316s from RP A6 306, 0 units 315s from RP A5 305, and 1 unit 314s from RP A4 304), and the resulting WIP is 2 units 365w (2 units 317w from RP A7 307, 0 units 316w from RP A6 306, 0 units 315w from RP A5 305, and 0 units 314w from RP A4 304) totaling the yield of 6 units 364y from the preceding RP B4 354. Component and resource usage 317c, 316c, 315c, 314c is transferred from RP A7 307, RP A6 306, RP A5 305, and RP A4 304.

In an alternative embodiment of the present invention, the product change may involve only a portion of the production quantities (yield, scrap, and WIP) transferred to the new order with a remainder staying with the original order. According to this alternative embodiment, both the new order and the original order survive the product change process. In the example embodiment shown in FIG. 3, after the new Order_B is created and the production quantities (yield, scrap, and WIP) are transferred to Order_B, the original Order_A is deleted.

In the example embodiment depicted in FIG. 3, scrap, WIP, and component and resource usage from unmapped reporting points in the original order were transferred to the new order at the next or subsequent mapped reporting point. This process may be referred to as "soft down" product change. According to one embodiment of the present invention, if there is no subsequent mapped reporting point, scrap, WIP, and/or component and resource usage may be transferred to new order at the final reporting point in the new order. In another embodiment of the present invention, WIP, scrap, and/or component and resource usage at an unmapped reporting point may be transferred to the new order at the first earlier or preceding mapped reporting point. If there is no preceding mapped reporting point, WIP, scrap, and/or component and resource usage may be transferred to the new order at the first reporting point in the new order. This process may be referred to as "soft up" product change. In one embodiment, the transfer of WIP, scrap, and/or component and resource usage at the final reporting point in an original order is always made to the final reporting point in the new order regardless of whether "soft up" or "soft down" product change is being used.

What is claimed is:

1. A method for changing an order for a product in a flexible order transaction system wherein production of the order is currently in progress, comprising the steps executed by a computer processor of:
   receiving a request to change the order for the product, the request specifying a new product;
   determining at least one of a yield quantity, a scrap quantity, and a work-in-process quantity at each reporting point in a first production process for the order for the product, the first production process including a plurality of reporting points;
   mapping at least two pairs of reporting points between the first production process for the order and a second production process for a new order for the new product, the second production process including a plurality of reporting points;
   moving, at each mapped pair of reporting points, the yield quantity, the scrap quantity, and the work-in-process quantity from the order to the new order; and
   transferring, for each unmapped reporting point in the first production process for the order, the scrap quantity and the work-in-process quantity as a function of the mapped reporting points.

2. The method according to claim 1, wherein the order and the new order are for the manufacturing of a product.

3. The method according to claim 1, wherein the yield quantity is a quantity of the product that is successfully processed.

4. The method according to claim 1, wherein the scrap quantity is a quantity of the product that is unsuccessfully processed and can't be reprocessed.

5. The method according to claim 1, wherein the work-in-process quantity is a quantity of the product that has not yet undergone processing.

6. The method according to claim 1, wherein the work-in-process quantity is at least one of a first quantity of the product that has not yet undergone processing, a second quantity of the product currently undergoing processing, and a third quantity of the product that is unsuccessfully processed but can still be reprocessed.

7. The method according to claim 1, wherein the mapping step further comprises:
mapping at least two pairs of reporting points between the first production process for the order and a second production process for a new order as a function of a mapping table, the mapping table stored as part of the flexible order system and the second production process including a plurality of reporting points.

8. The method according to claim 1, wherein the plurality of reporting points for the first production process is different than the plurality of reporting points for the second production process.

9. The method according to claim 1, wherein the first production process is different than the second production process, the second process structure including a plurality of reporting points that is different than the plurality of reporting points for the first production process.

10. The method according to claim 1, the transferring step further comprising:
transferring, for each unmapped reporting point in the first production process for the order, the scrap quantity and the work-in-process quantity to a reporting point in the second production process for the new order as a function of the mapped reporting points using at least one of a first preceding mapped reporting point in first production process and the first reporting point in the second production process.

11. The method according to claim 1, further comprising the step of:
transferring, for each unmapped reporting point in the first production process for the order, the scrap quantity and the work-in-process quantity to a reporting point in the second production process for the new order as a function of the mapped reporting points using at least one of a first subsequent mapped reporting point in first production process and the last reporting point in the second production process.

12. A system for changing an order for a product in a flexible order transaction system wherein production of the order is currently in progress, comprising:
a program memory;
a storage device; and
a processor, wherein the processor is adapted to:
(i) receive a request to change the order for the product, the request specifying a new product,
(ii) determine at least one of a yield quantity, a scrap quantity, and a work-in-process quantity at each reporting point in a first production process for the order for the product, the first production process including a plurality of reporting points,
(iii) map at least two pairs of reporting points between the first production process for the order and a second production process for a new order for the new product, the second production process including a plurality of reporting points,
(iv) move, at each mapped pair of reporting points, the yield quantity, the scrap quantity, and the work-in-process quantity from the order to the new order, and
(v) transfer, for each unmapped reporting point in the first production process for the order, the scrap quantity and the work-in-process quantity as a function of the mapped reporting points.

13. The system according to claim 12, wherein the yield quantity is a quantity of the product that is successfully processed.

14. The system according to claim 12, wherein the scrap quantity is a quantity of the product that is unsuccessfully processed and can't be reprocessed.

15. The system according to claim 12, wherein the work-in-process quantity is a quantity of the product that has not yet undergone processing.

16. The system according to claim 12, wherein the work-in-process quantity is at least one of a first quantity of the product that has not yet undergone processing, a second quantity of the product currently undergoing processing, and a third quantity of the product that is unsuccessfully processed but can still be reprocessed.

17. The system according to claim 12, wherein the plurality of reporting points for the first production process is different than the plurality of reporting points for the second production process.

18. The system according to claim 12, wherein the first production process is different than the second production process, the second process structure including a plurality of reporting points that is different than the plurality of reporting points for the first production process.

19. The system according to claim 12, wherein the processor is further adapted to:
transfer, for each unmapped reporting point in the first production process for the order, the scrap quantity and the work-in-process quantity to a reporting point in the second production process for the new order as a function of the mapped reporting points using at least one of a first preceding mapped reporting point in first production process and the first reporting point in the second production process.

20. The system according to claim 12, wherein the processor is further adapted to:
transfer, for each unmapped reporting point in the first production process for the order, the scrap quantity and the work-in-process quantity to a reporting point in the second production process for the new order as a function of the mapped reporting points using at least one of a first subsequent mapped reporting point in first production process and the last reporting point in the second production process.

21. A system for changing an order for a product in a flexible order transaction system wherein production of the order is currently in progress, comprising:
a program memory;
a storage device, the storage device containing a mapping table; and
a processor, wherein the processor is adapted to:
(i) receive a request to change the order for the product, the request specifying a new product,
(ii) determine at least one of a yield quantity, a scrap quantity, and a work-in-process quantity at each reporting point in a first production process for the order for the product, the first production process including a plurality of reporting points,
(iii) map at least two pairs of reporting points between the first production process for the order and a second production process for a new order for the new product as a function of the mapping table, the mapping table stored as part of the flexible order transaction system and the second production process including a plurality of reporting points, (iv) move, at each mapped pair of reporting points, the yield quantity, the scrap quantity, and the work-in-process quantity from the order to the new order, and (v) transfer, for each unmapped reporting point in the first production process for the order, the scrap quantity and the work-in-process quantity as a function of the mapped reporting points.

22. A computer-readable medium containing a set of instructions adapted to be executed by a processor to implement a method changing an order for a product in a flexible order transaction system wherein production of the order is currently in progress, the method comprising the steps of:

receiving a request to change the order for the product, the request specifying a new product;

determining at least one of a yield quantity, a scrap quantity, and a work-in-process quantity at each reporting point in a first production process for the order for the product, the first production process including a plurality of reporting points;

mapping at least two pairs of reporting points between the first production process for the order and a second production process for a new order for the new product, the second production process including a plurality of reporting points;

moving, at each mapped pair of reporting points, the yield quantity, the scrap quantity, and the work-in-process quantity from the order to the new order; and transferring, for each unmapped reporting point in the first production process for the order, the scrap quantity and the work-in-process quantity as a function of the mapped reporting points.

* * * * *